United States Patent [19]

Steinberg

[11] 4,196,660
[45] Apr. 8, 1980

[54] COMBINATION VEGETABLE CUTTER AND COOKER

[76] Inventor: Thomas K. Steinberg, Star Rte., Box 512, Bremerton, Wash. 98310

[21] Appl. No.: 16,518

[22] Filed: Mar. 1, 1979

Related U.S. Application Data

[63] Continuation-in-part of Ser. No. 844,976, Oct. 25, 1977, abandoned.

[51] Int. Cl.² .............................................. A47J 37/12
[52] U.S. Cl. ...................................... 99/353; 83/403; 99/407; 426/438; 426/518
[58] Field of Search ...................... 83/167, 403, 409.1, 83/411 R; 99/352, 353, 403, 407, 348, 413; 426/464, 518, 523, 637, 438, 473

[56] References Cited

U.S. PATENT DOCUMENTS

| 284,078 | 8/1883 | Sherman | 83/403 X |
|---|---|---|---|
| 1,520,860 | 12/1924 | Denz | 99/353 |
| 1,531,256 | 3/1925 | Morrow | 99/353 |
| 1,629,355 | 5/1927 | Morrow | 99/353 |
| 1,666,019 | 4/1928 | McCarthy | 99/353 |
| 1,994,909 | 3/1935 | Ehrgott | 99/413 X |
| 2,026,003 | 12/1935 | Sharp | 99/353 |
| 2,186,345 | 1/1940 | Reidenbach | 99/353 X |
| 2,195,879 | 4/1940 | Urschel | 83/403 |
| 2,504,110 | 4/1950 | Davis | 99/353 |
| 3,280,723 | 10/1966 | Hughes | 99/353 |

FOREIGN PATENT DOCUMENTS 1082552  12/1954  France ...................................... 99/353

*Primary Examiner*—Billy J. Wilhite
*Attorney, Agent, or Firm*—Robert W. Beach; Ward Brown

[57] ABSTRACT

A circular vegetable cutting tray is supported in the upper portion of a cooking pot and includes a circumferential wall having apertures therethrough. Each aperture has a cutting edge past which vegetables can be moved by radiating arms of a rotor received in the vegetable cutting tray. An electric motor mounted on a cover for the pot can be connected to rotate the rotor and such cover and vegetable cutting tray are interconnected to prevent relative rotation of the cover and tray as the rotor is rotated.

9 Claims, 4 Drawing Figures

U.S. Patent  Apr. 8, 1980  4,196,660
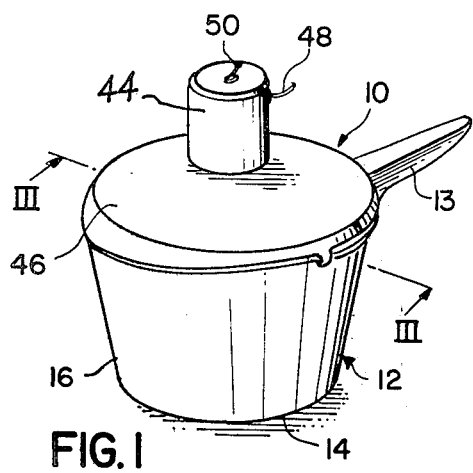
FIG.1
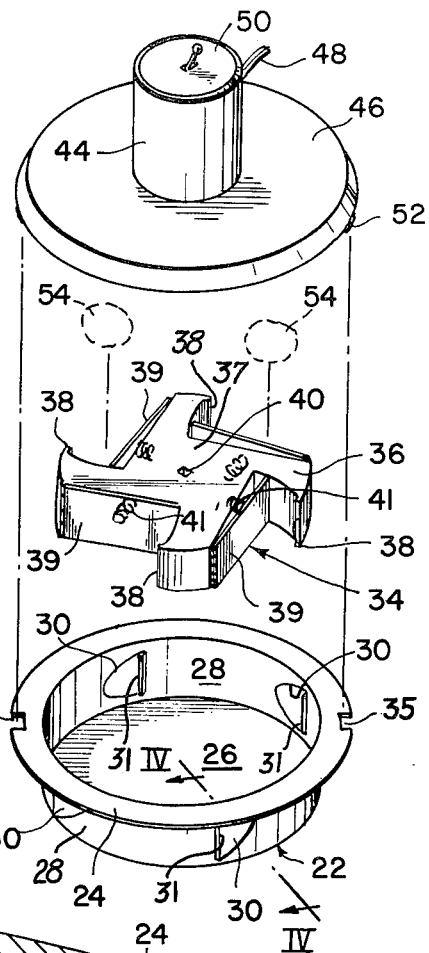
FIG.2
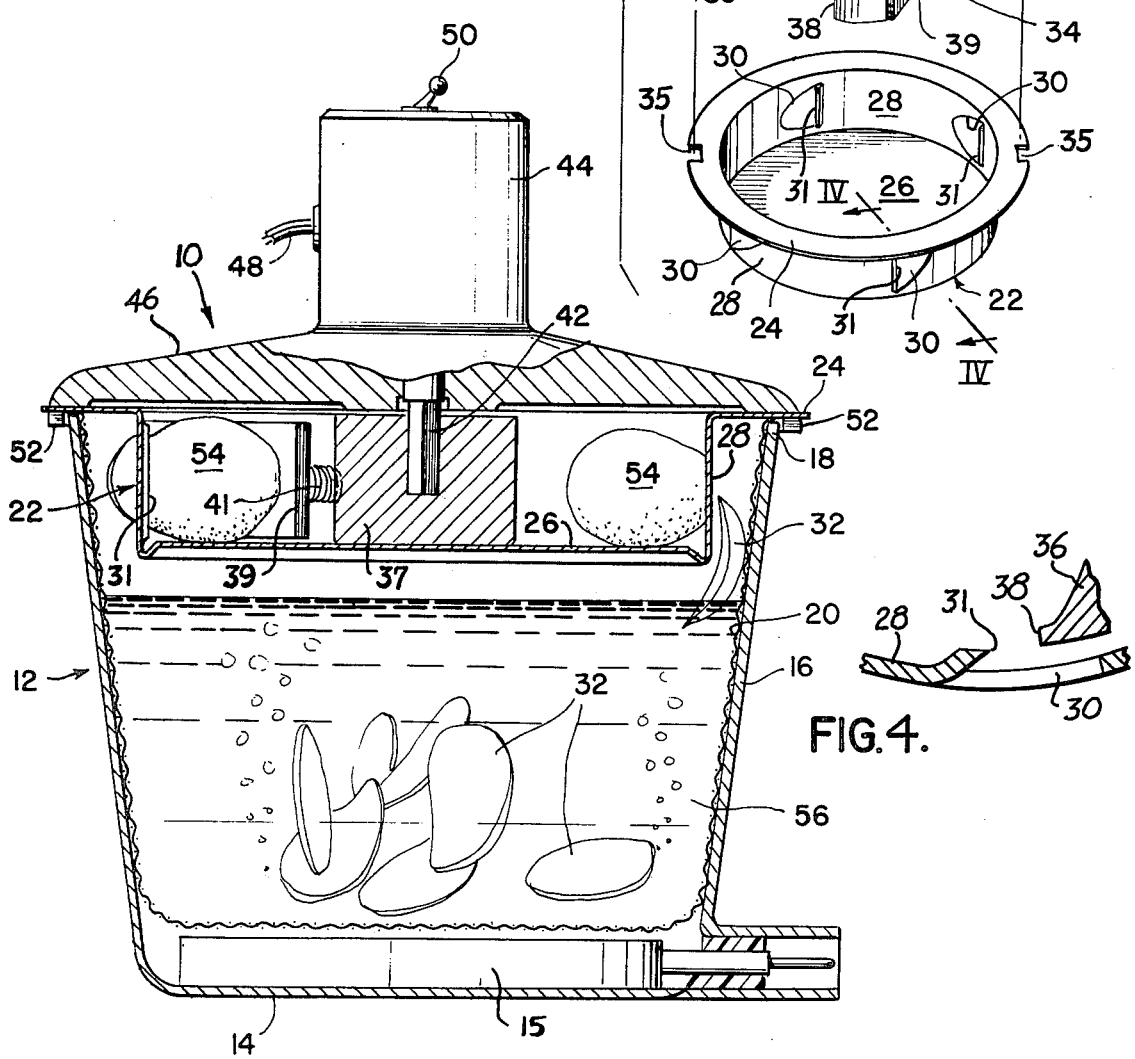
FIG.3
FIG.4

COMBINATION VEGETABLE CUTTER AND COOKER

CROSS-REFERENCE

This application is a continuation-in-part of United States patent application Ser. No. 844,976 filed Oct. 25, 1977, now abandoned, in the name of Thomas K. Steinberg, for Device for Making and Frying Chips.

BACKGROUND OF THE INVENTION

1. Field of the Invention

This invention relates to the combination of a vegetable cutter and cooker principally for tuberous vegetables.

2. Prior Art

Machines for cutting tuberous vegetables into slices or strips previously have been independent of vegetable cookers. Also cookers used heretofore have French fried vegetables that have been cut by hand or by machines entirely separate from the cooker.

SUMMARY OF THE INVENTION

The principal object of the present invention is to provide a combination vegetable cutter and cooker so that vegetables cut by the cutter will be supplied directly to the cooker without delay and without any intermediate handling.

Another object of the invention is to provide a vegetable cutter in a combination vegetable cutter and cooker which can be used to cut tuberous vegetables into different types of pieces such as slices, corrugated slices or strips.

A further object of the invention is to provide a compact combination of vegetable cutter and cooker which will not be appreciably more bulky than a cooker alone.

A more specific object is to utilize a cooking pot as the support for a vegetable cutter.

The foregoing objects can be accomplished by providing a vegetable cooker in the form of a pot, preferably of circular cross section, and mounting a vegetable cutter on the underside of a cover for the pot. The vegetable cutter can be powered by a motor mounted on the pot cover.

BRIEF DESCRIPTION OF THE DRAWINGS

FIG. 1 is a top perspective of the combination vegetable cutter and cooking pot of the present invention.

FIG. 2 is an exploded top perspective of the vegetable cutter and pot cover.

FIG. 3 is a vertical section through the combination vegetable cutter and cooker taken along line III—III of Fig. 1.

FIG. 4 is a detail section taken on line IV—IV of FIG. 2.

DETAILED DESCRIPTION

The vegetable cutter and pot cover component 10 is shown in FIG. 1 as being mounted on the pot cooker 12. The pot can be carried and manipulated by a conventional handle 13 projecting outward from the upper edge of the pot wall 16. The pot can be of the self-heating type by having a sealed electric heating element 14 located in the bottom of the pot. Alternatively, such heating element can be omitted and the pot can be heated by being placed on a hot surface. For convenience in removing vegetable pieces 32 from the pot 12 after they are cooked and the cover component 10 has been removed, a wire mesh basket 20 of a size and shape conforming to the interior of the pot can be suspended from the rim 18 of the pot.

The vegetable cutter and pot cover component 10 shown in FIGS. 2 and 3 includes a circular cutting tray 22 that is supported in the upper portion of the pot 16. A circumferential flange 24 projecting outward from the upper periphery of the tray upright circumferential side or wall 28 is of a size to rest on the pot rim 18 for supporting the tray. The bottom 26 of the tray is spaced axially of the tray 22 from the flange 24 a distance sufficient to accommodate vegetables 54 of desired size in the tray.

Spaced circumferentially of the tray upright circumferential wall 28 are apertures 30. An upright edge 31 of each aperture forms a cutting edge past which vegetables to be cut are pushed so that pieces 32 cut by such edges from portions of vegetables pressed against the circumferential wall of the tray. The pieces cut from the vegetables pass through the apertures 30 and fall into the pot beneath the cutting tray.

Vegetables are pushed in the direction indicated by the arrow in FIG. 2 against the cutting edges 31 by radiating arms 36 of a rotor 37 received in the tray 22. Each arm is of a length such that its lip 38 at its outer end moves close to the inner side of the tray wall 28 so that the arms will cooperate with the cutting edges 31 to push the vegetables along a path substantially parallel and adjacent to the inner surface of the tray wall. Vegetables are pushed outward toward the tray wall by the swinging end of a leaf 39 having its leading end hinged to the trailing side of the next forward arm 36 of the rotor 34. The swinging end of such leaf is urged toward the tray side 28 by a compression spring 41 engaged between the leaf and the central portion of the rotor. The outward movement of each leaf is limited by the engagement of its swinging and with a lip 38 on the end of the rotor arm 36.

The rotor is rotated about a vertical axis by the lower end of a drive shaft 42 received in an upwardly opening socket 40 in the hub 37 of the rotor. To prevent relative rotation of the drive shaft and the rotor, the lower end of the drive shaft and the socket 40 are of noncircular cross section, being shown in the drawings as being of square cross section. The drive shaft is driven by a motor 44 carried by the cover 46. Electricity for powering the motor is supplied by an electric cord 48, and the operation of the motor is controlled by an on-off switch 50 mounted on top of the housing for motor 44.

To prevent the torque of motor 44 or the pressure of the vegetables against the cutting edges 31 by rotation of rotor 34 from turning the tray 22 relative to the pot cover 46, one or more notches 35 in the rim 24 of the cutting tray can be engaged with lugs 52 projecting downward from the rim of the cover 46 outward of the rim 18 of the pot 12.

In assembling the various elements of the combination vegetable cutter and cooker, first the basket 20 is inserted into the pot and the pot filled with cooking oil or fat to the desired level. Next, tray 22 is set into the upper portion of the pot supported by its flange 24 resting on the pot rim 18. Leaves 39 are swung manually toward the center of the rotor, compressing their springs 41, either manually or by pressing vegetables to be cut against them, and such vegetables are placed in the tray 22 between such leaves and the tray wall 28. Finally, the cover 46 is applied to the pot over the vegetable cutter, inserting its noncircular drive shaft 42 into the socket 40 of the rotor and then engaging the cover lugs 52 in the notches 35 of the cutter tray rim 24. Engagement of such lug over the rim 18 of the pot 12 will prevent the cover from sliding off the pot.

In operation, arms 36 of rotor 34 propel vegetables in their respective pockets between the arms around the tray. Leaves 39, urged outward by springs 41, and centrifugal force resulting from rotation of the vegetables by the rotor, press such vegetables against the inner side of the tray wall 28. During circumferential movement of the vegetables engaged by the arm lips 38, portions of the vegetables pushed through apertures 39 will be sliced off by the cutting edges 31 as the vegetables are forced past such cutting edges by the rotating rotor. The cut-off slices 32 will drop between the cutting tray wall 28 and the pot wall 16 down into the cooking oil bath.

By appropriately locating the cutting edges 31 inward from the inner surface of the circumferential cutting tray wall 28, the thickness of successive slices cut from the vegetables can be altered. Also, by forming the cutting edges 31 of appropriate shape, the pieces cut from the vegetables can be smooth or corrugated complemental to the shapes of the cutting edges. In fact, some cutting edges can be planar and others can be contoured so that pieces of a variety of shapes or sizes can be cut successively from vegetables.

While the cutter is intended primarily to be used for cutting potatoes, it could also be used to cut pieces of yams, turnips and rutabagas.

When the vegetables of the batch placed in the cutting tray 22 have been cut up, the cut pieces dropped into the cooking oil bath and the pieces cooked, the cover component 10 is removed, the basket 20 withdrawn from the cooking oil bath and the cooked vegetable pieces are ready for consumption.

I claim:

1. A vegetable cutter and cooker combination comprising a cooking pot, a vegetable cutting tray having an aperture in a wall thereof provided with a vegetable cutting edge, supporting means suspending said tray from the rim of said pot with said tray located in the upper portion of said pot and having said aperture spaced from the wall of said pot, and pushing means within said tray for moving vegetables within said tray past said vegetable cutting edge of said aperture for cutting pieces from vegetables in said tray for discharge from said tray through said aperture into said pot for cooking.

2. The combination defined in claim 1, in which the pushing means includes a pivoted wing swingable for pressing vegetables within the vegetable cutting tray against the wall having the aperture therein.

3. The combination defined in claim 1, in which the pushing means includes a rotor, a cover for the cooking pot, and an electric motor mounted on said cooking pot cover and connectable to said rotor for rotating said rotor in the cutting tray.

4. The combination defined in claim 3, the cooking pot cover being separable from the vegetable cutting tray, and means connecting the tray and the cover for deterring relative rotation of the cover and the tray.

5. The combination defined in claim 4, in which the means for deterring relative rotation of the cover and the vegetable cutting tray includes a lug on one of such members engaged in a recess of the other member.

6. The cutter defined in claim 1, in which the vegetable cutting tray has an external flange resting on the rim of the pot and constituting the supporting means.

7. The combination defined in claim 1, in which the vegetable cutting tray and the pot are circular, and the tray includes a circumferential wall in which the aperture is located spaced inwardly from the wall of the pot.

8. The combination defined in claim 1, in which the aperture is in a side wall of the tray, and the pushing means includes a rotor rotatable within the vegetable cutting tray and having leaves pivoted for swinging about axes parallel to the rotor axis and spring means for urging said leaves toward the tray side wall.

9. The combination defined in claim 1, in which the pushing means includes a rotor having radiating arms forming pockets between them for receiving vegetables, leaves received in the respective pockets and pivotally mounted on said rotor, and spring means for swinging said leaves toward the circumferential wall of the vegetable cutting tray.

* * * * *